(12) United States Patent
Repperger (10) Patent No.: US 10,069,702 B2
(45) Date of Patent: *Sep. 4, 2018

(54) DYNAMIC DISCOVERY OF APPLICATIONS, EXTERNAL DEPENDENCIES, AND RELATIONSHIPS

(71) Applicant: MICROSOFT TECHNOLOGY LICENSING, LLC, Redmond, WA (US)

(72) Inventor: Michael Repperger, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/683,413

(22) Filed: Aug. 22, 2017

(65) Prior Publication Data
US 2018/0041412 A1 Feb. 8, 2018

Related U.S. Application Data

(63) Continuation of application No. 15/298,560, filed on Oct. 20, 2016, now Pat. No. 9,774,513, which is a
(Continued)

(51) Int. Cl.
*G06F 15/16* (2006.01)
*H04L 12/26* (2006.01)
(Continued)

(52) U.S. Cl.
CPC ...... *H04L 43/0823* (2013.01); *G06F 11/0709* (2013.01); *G06F 11/079* (2013.01); *H04L 41/0631* (2013.01); *G06F 2201/865* (2013.01)

(58) Field of Classification Search
CPC .................................................. G06F 2201/865
(Continued)

(56) References Cited

U.S. PATENT DOCUMENTS 6,321,263 B1 * 11/2001 Luzzi .................. G06F 11/3495
702/186
7,590,653 B2 9/2009 Sparks
(Continued)

FOREIGN PATENT DOCUMENTS

| CN | 101010669 A | 8/2007 |
|---|---|---|
| CN | 101226499 A | 7/2008 |

(Continued)

OTHER PUBLICATIONS

"Server and Application Monitor (Formerly Application Performance Monitor)", Solarwinds, published Apr. 13, 2012, Retrieved From: http://content.solarwinds.com/creative/pdf/datasheets/SolarWinds_SAM_Datasheet.pdf, Retrieved Date: Jun. 24, 2013 (4 pages total).
(Continued)

*Primary Examiner* — Hamza N Algibhah
(74) *Attorney, Agent, or Firm* — Karin L. Williams; Mayer & Williams, PC (57) ABSTRACT

A monitoring system is arranged for automatically and dynamically discovering local applications running on servers in an enterprise-scale service environment as well as discovering external resources (both partitioned and non-partitioned resources) that the local applications use. The discovered objects and their dependencies are instantiated into a health map and the map is dynamically updated as applications and resources are added to and deleted from the enterprise-scale service environment. Health indicators such as events, performance counters, synthetic transactions, and SysLog and SNMP (Simple Network Management Protocol)
(Continued)

service events for the mapped objects are monitored. The monitored health indicators are attributed to either the health of a local application or that of an external resource. Upon detection of a fault, the health map enables performance of root cause analyses and determination of the impact of the fault on the objects in the environment so that appropriate alerts can be raised.

20 Claims, 9 Drawing Sheets

Related U.S. Application Data continuation of application No. 14/032,334, filed on Sep. 20, 2013, now Pat. No. 9,503,341.

(51) Int. Cl.
*G06F 11/07* (2006.01)
*H04L 12/24* (2006.01)

(58) Field of Classification Search
USPC .......................................................... 709/224
See application file for complete search history.

(56) References Cited

U.S. PATENT DOCUMENTS

| | | | | |
|---|---|---|---|---|
| 8,626,912 | B1* | 1/2014 | Rothstein | H04L 43/18 370/235 |
| 8,966,039 | B1* | 2/2015 | Fultz | H04L 67/16 709/223 |
| 2002/0165892 | A1* | 11/2002 | Grumann | G06F 11/34 718/100 |
| 2003/0191842 | A1 | 10/2003 | Murphy et al. | |
| 2004/0064552 | A1* | 4/2004 | Chong | G06F 11/3006 709/224 |
| 2005/0114480 | A1* | 5/2005 | Ramamoorthy | H04L 67/1008 709/220 |
| 2005/0192965 | A1* | 9/2005 | Ferreira | G06F 9/465 |
| 2006/0075013 | A1* | 4/2006 | Hite | G06F 17/30734 709/201 |
| 2008/0215922 | A1 | 9/2008 | Cheng et al. | |
| 2009/0106256 | A1* | 4/2009 | Safari | G06F 11/1433 |
| 2009/0265139 | A1* | 10/2009 | Klein | G06F 11/0748 702/183 |
| 2010/0037211 | A1* | 2/2010 | Zakonov | G06F 11/3604 717/130 |
| 2011/0066719 | A1* | 3/2011 | Miryanov | G06F 11/3495 709/224 |
| 2011/0320586 | A1* | 12/2011 | Maltz | G06F 9/5027 709/224 |
| 2012/0117234 | A1* | 5/2012 | Miryanov | G06F 8/60 709/224 |
| 2012/0144034 | A1 | 6/2012 | McCarty | |
| 2012/0167081 | A1* | 6/2012 | Sedayao | G06F 11/30 718/1 |
| 2012/0233593 | A1 | 9/2012 | Sahoo et al. | |
| 2012/0297059 | A1 | 11/2012 | Bross | |
| 2013/0254373 | A1* | 9/2013 | Cockrell | G06F 11/3495 709/224 |
| 2014/0165054 | A1* | 6/2014 | Wang | G06F 9/45558 718/1 |
| 2014/0223423 | A1* | 8/2014 | Alsina | G06F 8/65 717/173 |
| 2014/0281738 | A1* | 9/2014 | Urmanov | G06F 11/0709 714/47.1 |
| 2014/0380192 | A1* | 12/2014 | Shukla | H04L 67/10 715/753 |
| 2015/0029193 | A1* | 1/2015 | Krajec | G06T 11/206 345/440 |
| 2015/0039745 | A1* | 2/2015 | Degioanni | H04L 43/045 709/224 |

FOREIGN PATENT DOCUMENTS

| | | |
|---|---|---|
| CN | 102201031 A | 9/2011 |
| WO | 2005094344 | 10/2005 |

OTHER PUBLICATIONS

"Automatically Discover Application Services", VMware vCenter Infrastructure Navigator, published Apr. 6, 2013, Retrieved From: http://www.vmware.com/products/datacenter-virtualization/vcenter-infrastructure-navigator, Retrieved Date: Jun. 24, 2013 (1 page total).
Machiraju, V., et al., "Towards Generic Application Auto-discovery", Session Two: Applications Management, Network Operations and Management Symposium, pp. 75-88, 2000 (14 pages total).
"International Search Report & Written Opinion Received for PCT Patent Application No. PCT/US2014/056183", dated Jan. 19, 2015, 9 Pages.
Non-Final Office Action Issued in U.S. Appl. No. 14/032,334, dated Nov. 6, 2015, 10 Pages.
Notice of Allowance Issued in U.S. Appl. No. 15/298,560, dated Jun. 19, 2017, 8 Pages.
Notice of Allowance Issued in U.S. Appl. No. 14/032,334, dated Jul. 20, 2016, 8 Pages.
"First Office Action and Search Report Issued in Chinese Patent Application No. 201480051883.7", dated Feb. 5, 2018, 11 Pages.

* cited by examiner

DYNAMIC DISCOVERY OF APPLICATIONS, EXTERNAL DEPENDENCIES, AND RELATIONSHIPS

CROSS REFERENCE TO RELATED APPLICATION

This application is a continuation of U.S. Ser. No. 15/298,560, filed Oct. 20, 2016, entitled, "DYNAMIC DISCOVERY OF APPLICATIONS, EXTERNAL DEPENDENCIES, AND RELATIONSHIPS", which is a continuation of U.S. Ser. No. 14/032,334, filed Sep. 20, 2013, entitled, "DYNAMIC DISCOVERY OF APPLICATIONS, EXTERNAL DEPENDENCIES, AND RELATIONSHIPS", now U.S. Pat. No. 9,503,341, issued Nov. 22, 2016 which are incorporated herein by reference in their entirety.

BACKGROUND

Enterprise-scale services typically have large numbers of servers in a particular role. The arrangement of the servers is typically fairly fluid as machines are added, removed, or taken out for maintenance. In addition, many enterprise-scale services utilize multiple copies of their service. As a result, designing a monitoring system that can automatically discover the services, and give relevant health state to an operations center can be challenging.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A monitoring system is arranged for automatically and dynamically discovering local applications running on servers in an enterprise-scale service environment as well as discovering external resources (both partitioned and non-partitioned resources) that the local applications use. The discovered objects and their dependencies are instantiated into a health map and the map is dynamically updated as applications and resources are added to and deleted from the enterprise-scale service environment. Health indicators such as events, performance counters, synthetic transactions, and SysLog and SNMP (Simple Network Management Protocol) service events for the mapped objects are monitored. The monitored health indicators are attributed to either the health of a local application or that of an external resource. Upon detection of a fault, the health map enables performance of root cause analyses and determination of the impact of the fault on the objects in the environment so that appropriate alerts can be raised.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
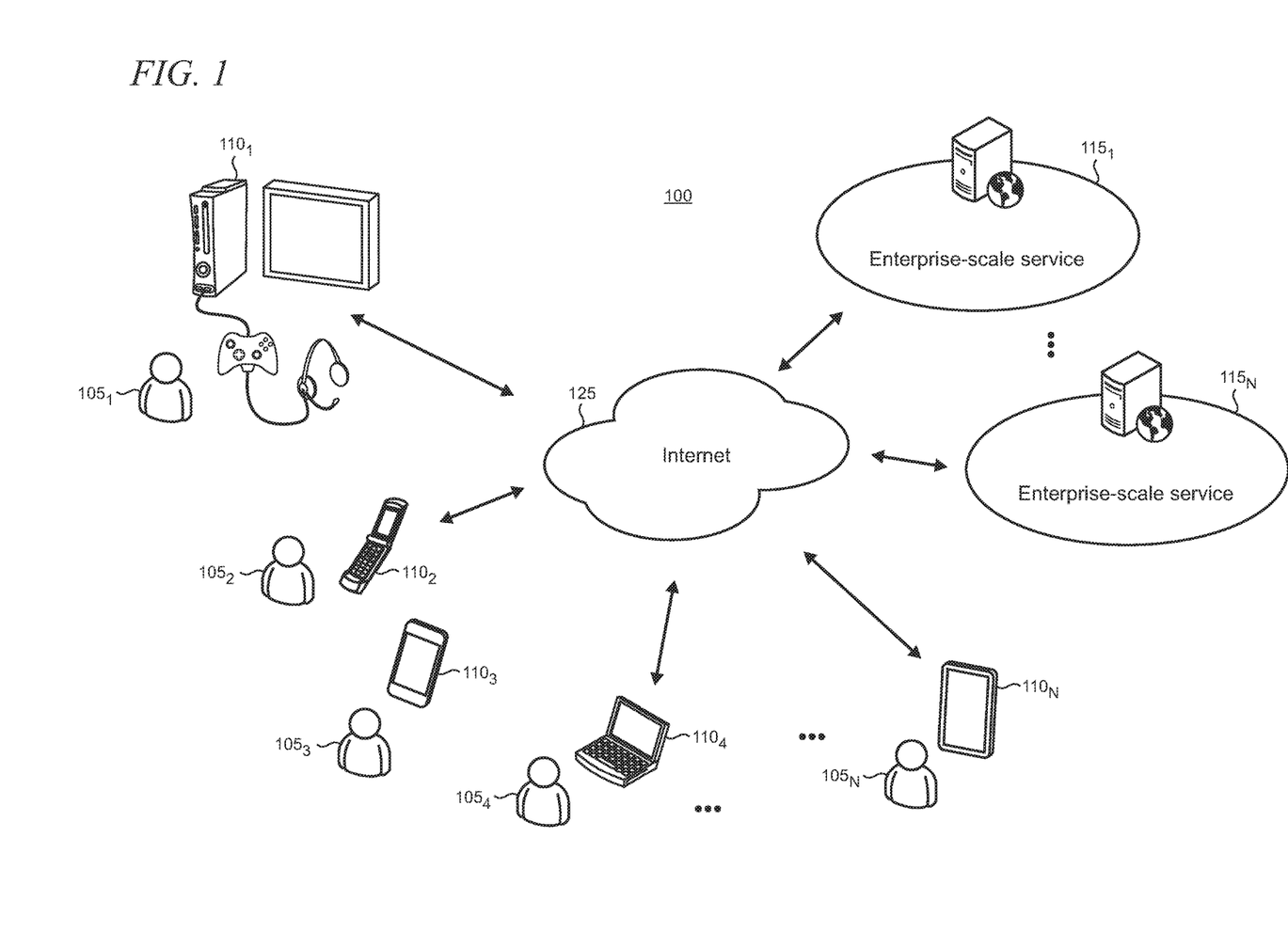
FIG. 1 shows an illustrative computing environment in which the present dynamic discovery of applications, external dependencies, and relationships may be implemented.

FIG. 1 shows an illustrative computing environment 100 in which the present dynamic discovery of applications, external dependencies, and relationships may be implemented. Users 105 of a variety of client devices 110 including multimedia consoles, mobile phones, smartphones, tablets, personal computers ("PCs"), personal digital assistants ("PDAs"), handheld gaming platforms, personal media players, wearable computers, navigation devices, and the like, may interact with one or more enterprise-scale services $115_1 \ldots _N$ over a network such as the Internet 125. For example, the enterprise-scale services 115 may host web applications, provide consumable media content, support browsable and/or interactive web pages, or the like, in any of a variety of applications.

Figure 2:
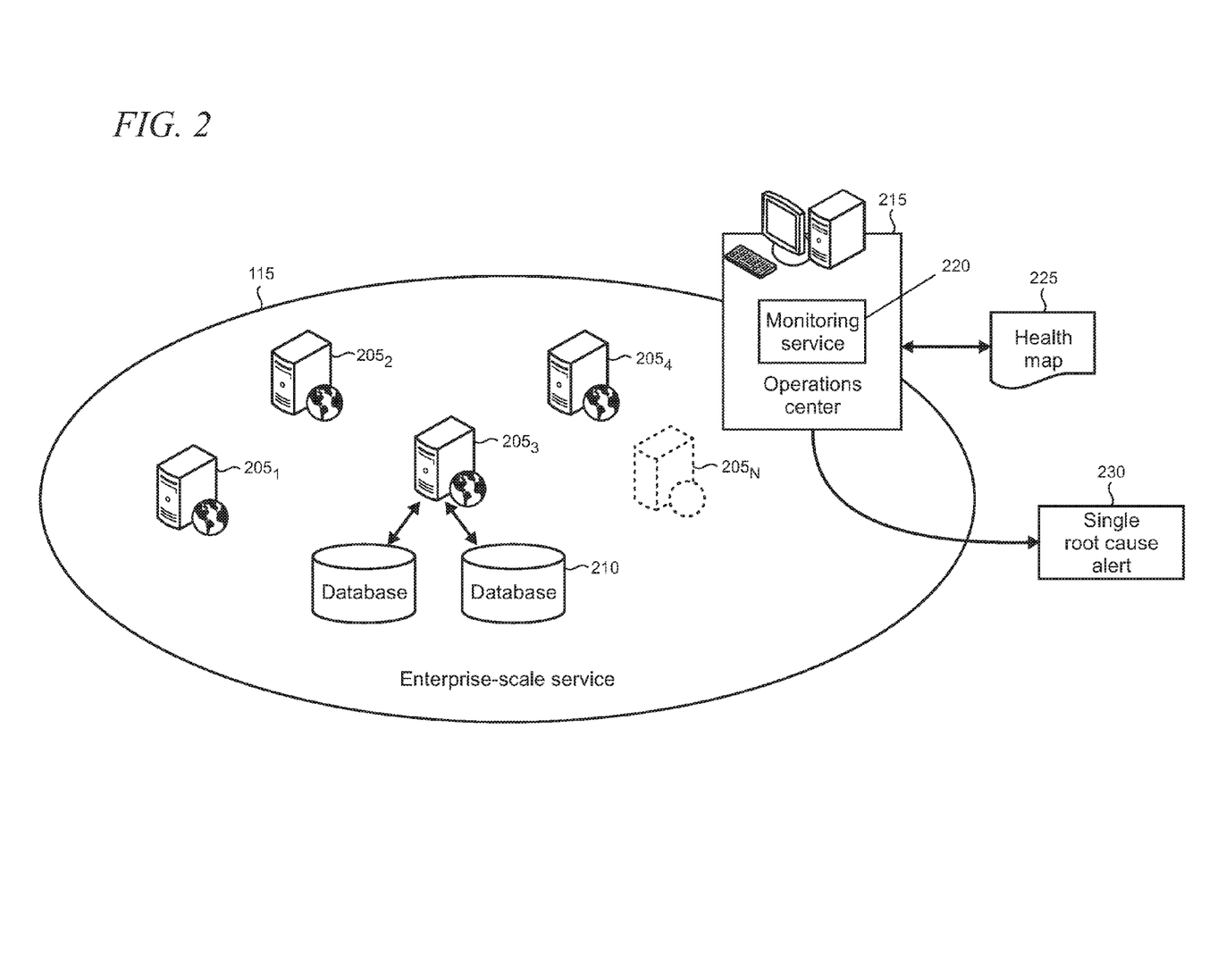
FIG. 2 shows servers, databases, and an operations center in an illustrative enterprise-scale service.

FIG. 2 shows servers, databases, and an operations center in an illustrative enterprise-scale service 115. As shown, a number of servers $205_{1, 2 \ldots N}$ are located in the service 115 and are utilized to support the interaction with the users 105 and client devices 110 (FIG. 1). In some cases, a given server 205 may be operatively coupled to one or more databases of external resources, as representatively indicated by reference numeral 210. During typical operations of the enterprise-scale service 115, servers 205 may be added to the environment, removed, or taken out for maintenance as representatively indicated by the dashed-line rendering of server $205_N$.

The operations center 215 is configured to be in communication with the servers 205 and external resources 210 so that monitoring of various operational aspects of the service 115 can be implemented. As described in more detail below, such monitoring may be performed by a monitoring service 220 and include instantiation of objects into a health map 225, and dynamic updating of the map as servers 205 and resources 210 are added and removed from the service 115 over time. The monitoring may also be utilized to generate a single root cause alert 230 upon detection of a fault that occurs in the service 115.

Figure 3:
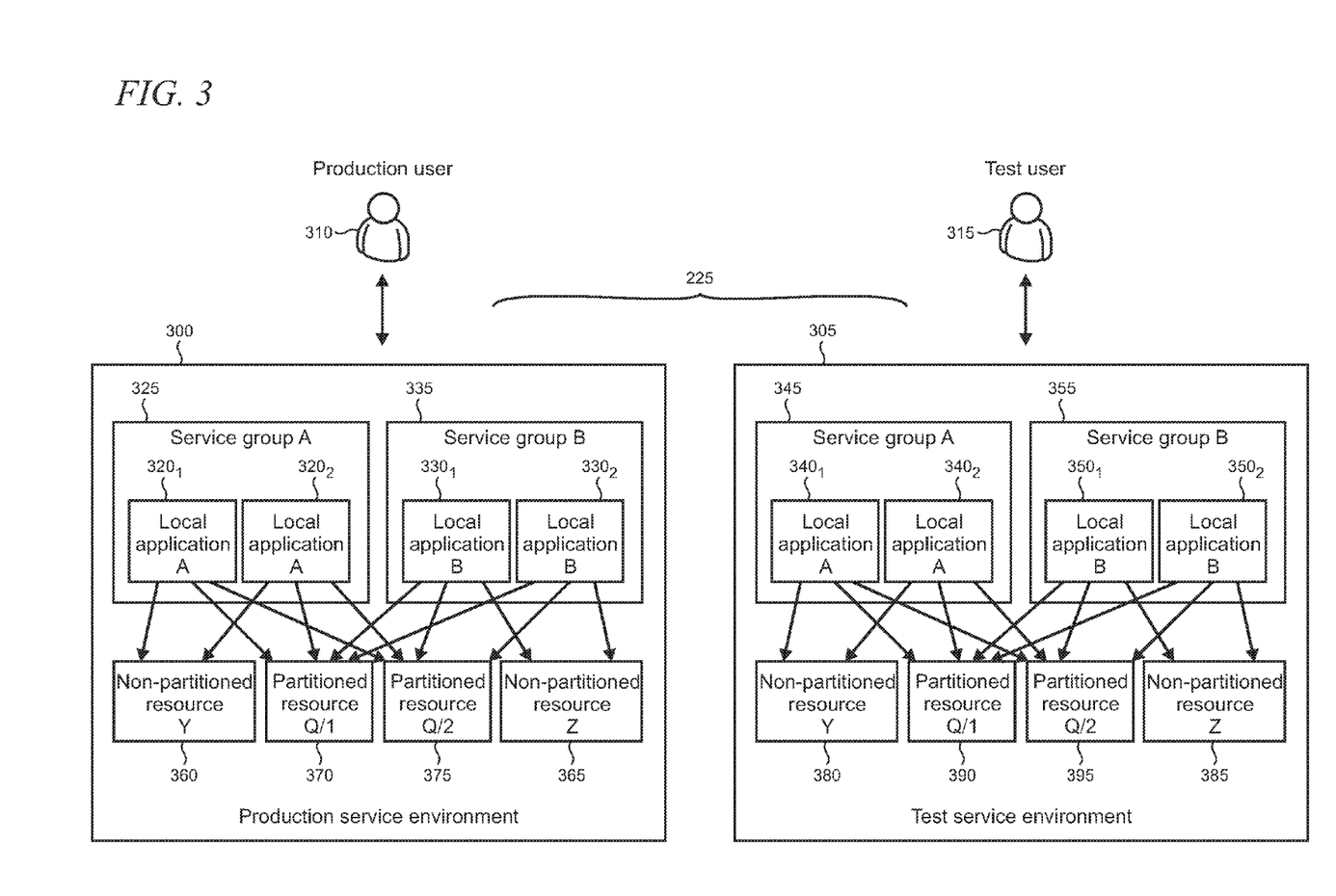
FIG. 3 shows duplicated servers and external resources arranged in illustrative production and test environments that may be utilized in an enterprise-scale service.

FIG. 3 shows an illustrative map 225 of duplicated servers and external resources arranged in illustrative production and test service environments (respectively indicated by reference numerals 300 and 305) that may be utilized in the enterprise-scale service 115. Duplication in this manner may typically be performed to ensure the provision of high quality and reliable services to the users 105. For example, if a fault or problem in the service is detected or reported by a production user 310, a test user 315 and/or other service personnel can perform tests, run diagnostics, attempt to duplicate the problem, or test potential solutions and workarounds, among other activities, in the test environment 305 without having to take down production servers and resources in the production environment 300 which would generally be highly disruptive to the service 115 and its users.

In both the production and test service environments, local applications are arranged in service groups. As used here, a local application is a single instance of an application running on a single server, for example, a www.xbox.com web server that supports Microsoft Corporation's game related service offerings. A service group is a group of local applications that provide a common function to a common consumer, for example, all of the www.xbox.com servers in a production environment (it is noted that all of the www.xbox.com servers in a test environment would be a different service group).

The production service environment 300, as shown in FIG. 3, includes two instances of local application A, as represented by reference numerals $320_1$ and $320_2$, in service group A 325. Two instances of local application B, $330_1$ and $330_2$, are in service group B 335. Duplicate instances of local application A, $340_1$ and $340_2$, are supported in the duplicate service group A 345 in the test service environment 305. Duplicate instances of local application B, $350_1$ and $350_2$, are supported in the duplicate service group B 355.

External resources are also supported in both the production service environment 300 and the test service environment 305. These external resources may include both non-partitioned external resources and partitioned external resources. As used here, a non-partitioned external resource is a service that a local application needs which is outside of itself and is seen as a single entity or "black box." A partitioned external resource is a service that a local application needs which is outside of itself, and for which the local application has a granular view of sub-components, such as individual servers.

The production service environment 300 includes non-partitioned resources Y and Z, as respectively indicated by reference numerals 360 and 365, and partitioned resources Q/1 and Q/2, as respectively indicated by reference numerals 370 and 375. The test service environment 305 includes duplicate non-partitioned resources Y and Z, as respectively indicated by reference numerals 380 and 385, and duplicate partitioned resources Q/1 and Q/2, as respectively indicated by reference numerals 390 and 395.

The dependencies between local applications and external resources are shown using the arrows in FIG. 3. It is noted that the illustrative map 225 can typically be expected to be dynamic and change as local applications, service groups, and resources are moved on and offline in the service. In addition, additional partitions of a partitioned resource may be dynamically added or removed. Accordingly, the particular local applications, service groups, resources, and their various dependencies and relationships in a particular map at a given time can vary. It may thus be appreciated that the map 225 shown in FIG. 3 represents a snapshot of the service 115 as it exists at some arbitrary time.

Figure 4:
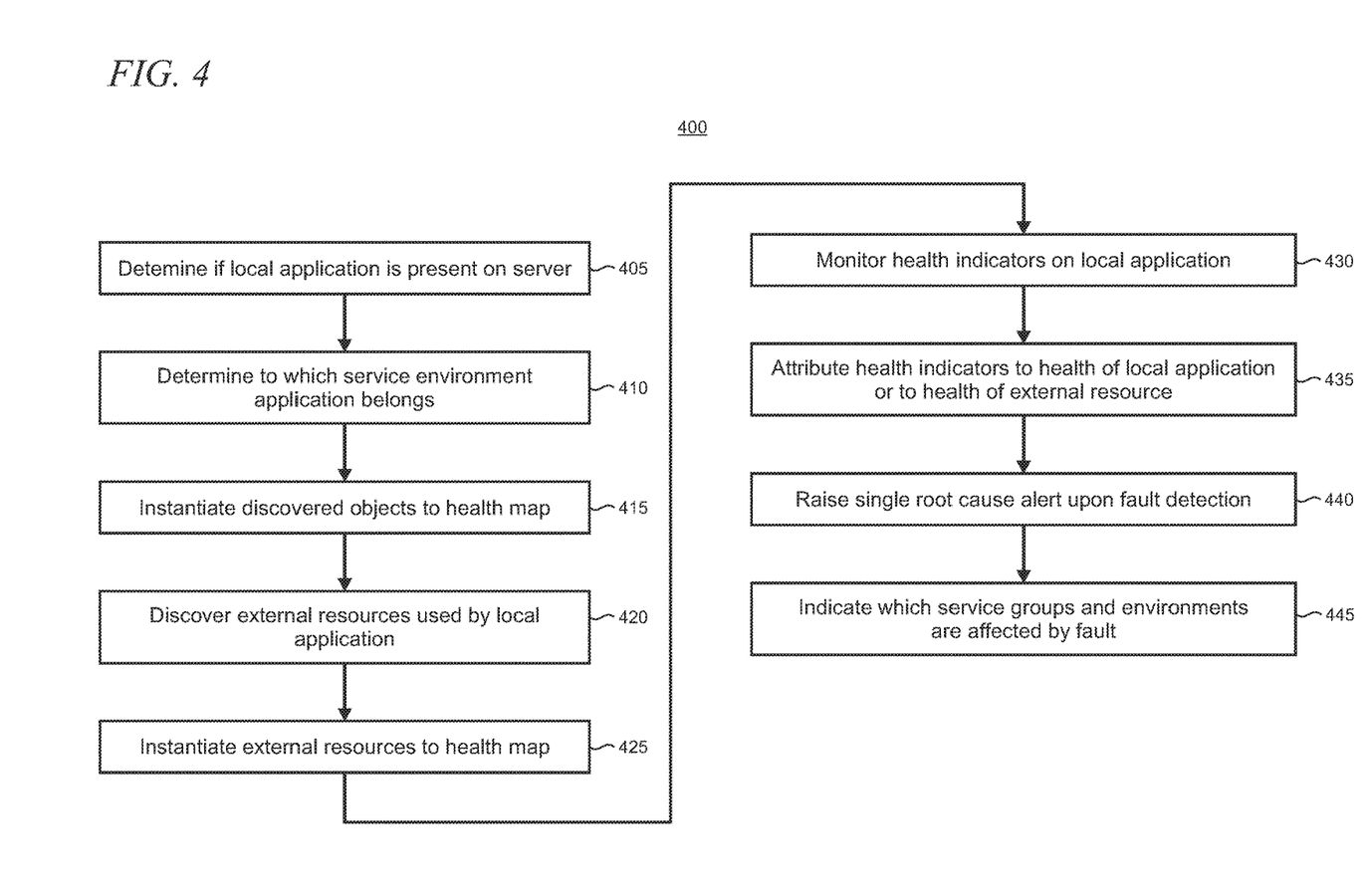
FIG. 4 is a flowchart of an illustrative method for dynamically discovering applications, external dependencies, and relationships.
Figure 5:
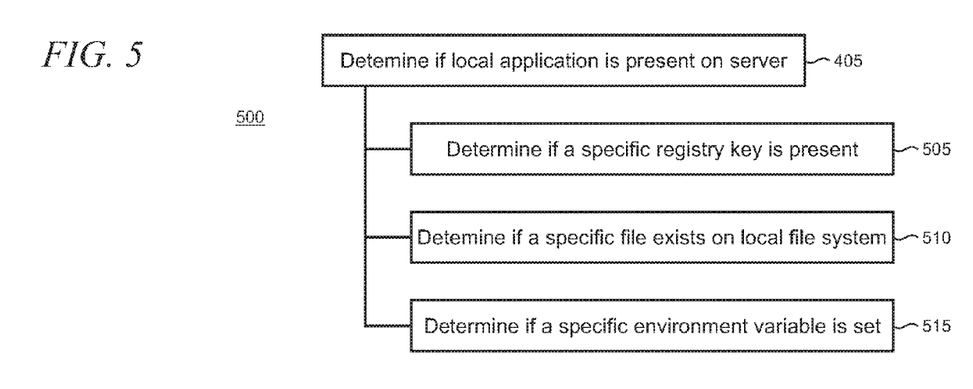
FIGS. 5-9 show illustrative taxonomies of various details of steps in the method shown in FIG. 4.
Figure 6:
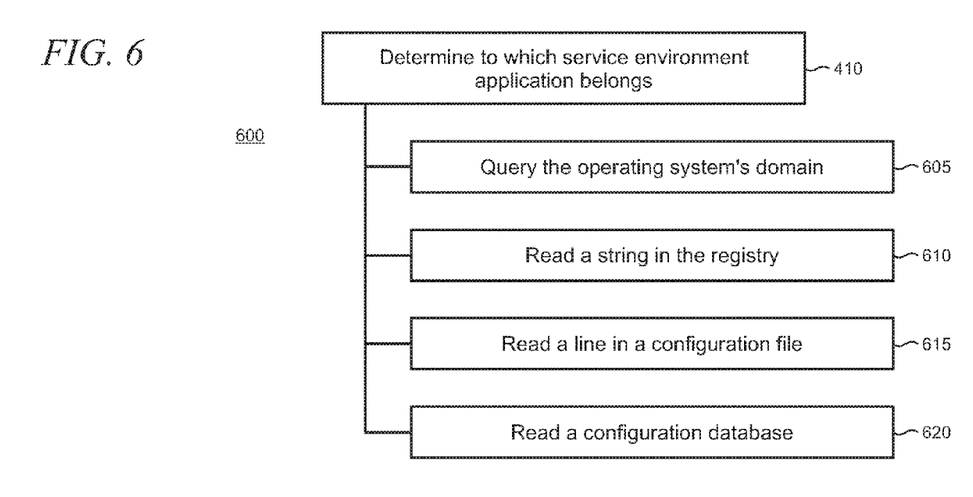
Figure 7:
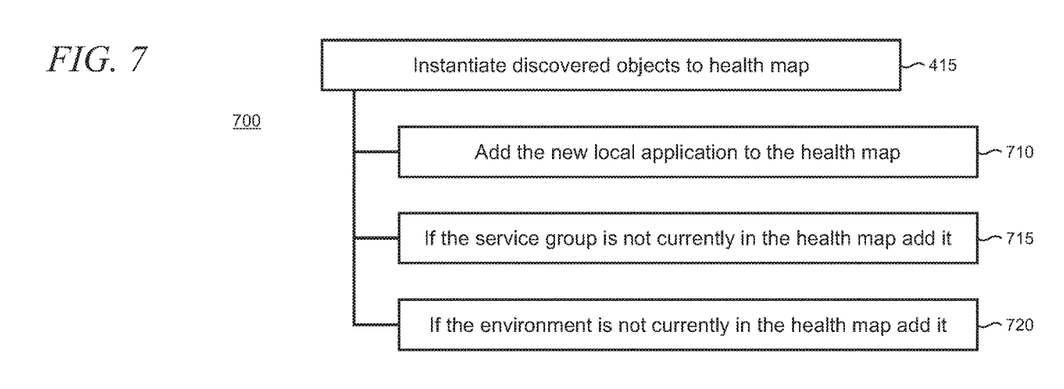
Figure 8:
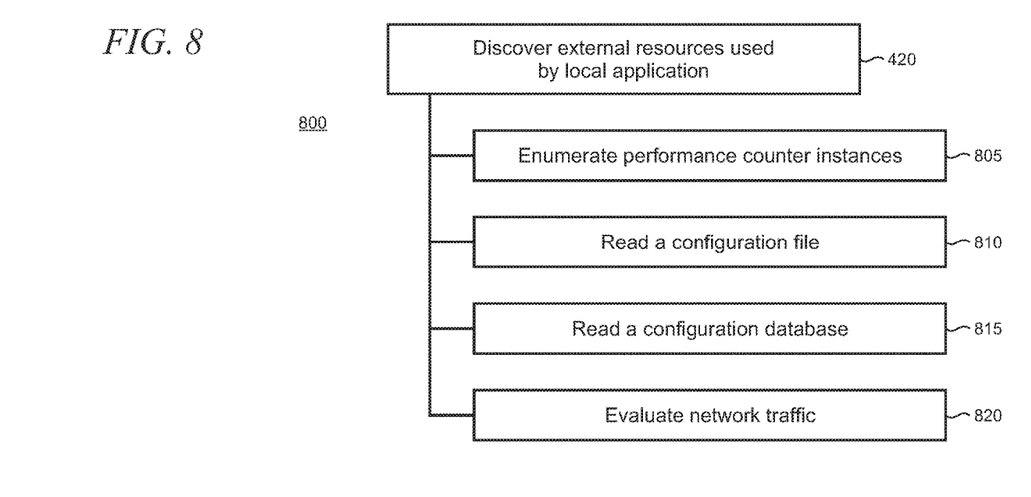
Figure 9:
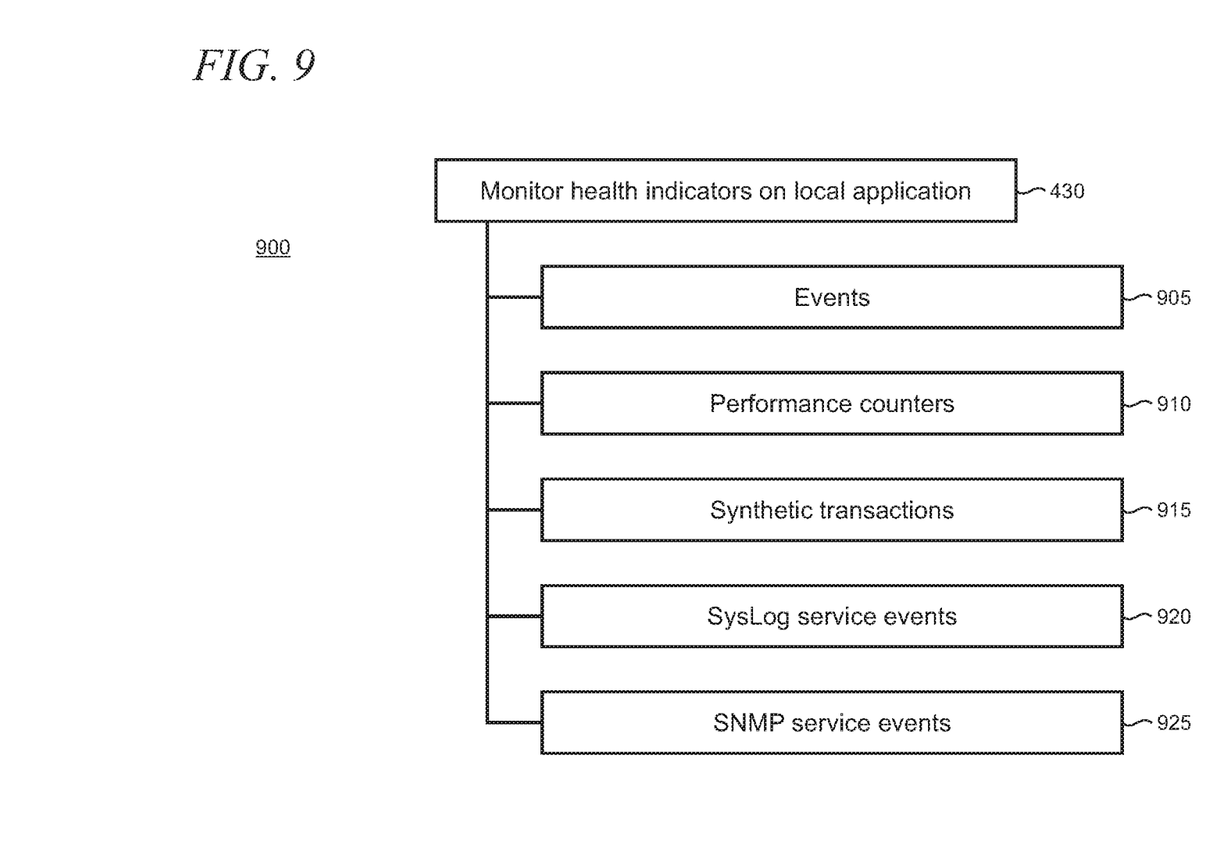

FIG. 4 is a flowchart of an illustrative method 400 for dynamically discovering applications, external dependencies, and relationships that may move into and out of the enterprise-scale service 115 shown in FIG. 2. Practice of the method may facilitate creation of a health map such as the map shown in FIG. 3 and then updating of the map to reflect changes as they occur. Data in the map may then be used to make health decisions and raise alerts with root cause identification when faults are detected. The method may be implemented, for example, using the monitoring service 220 that executes on a computing platform such as a server implemented at the operations center 215 (FIG. 2). Unless specifically stated, the methods or steps shown in the flowchart in FIG. 4 and the taxonomies in FIGS. 5-9 and described below are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 405, a determination is made as to whether a local application is present on a server in the environment. Referring to the taxonomy 500 in FIG. 5, this determination may be made using one or more alternative methods. For example, the monitoring service 220 can ask yes/no questions of the monitored servers including if a specific registry key is present (as indicated by reference numeral 505), if a specific file exists on a local file system (510), or if a specific environment variable is set (515).

Returning back to FIG. 4, at block 410, a determination is made as to which service environment a discovered local application belongs. Referring to the taxonomy 600 in FIG. 6, this determination may be made using one or more alternative methods. For example, the monitoring service 220 can query the operating system's domain (605), read a string in the registry (610), read a line in a configuration file (615), or read a configuration database (620).

Returning again to FIG. 4, at block 415, discovered objects are instantiated into the health map 225 (FIG. 2). Referring to the taxonomy 700 in FIG. 7, this determination may be performed using the steps shown. These include, for example, adding the new local application to the health map (710), if the service group associated with that application is not currently in the health map, then adding it to the health map (715), and if the service environment associated with the local application and service group is not currently in the health map, then adding it to the health map (720).

Returning again to FIG. 4, at block 420 discovery of external resources used by a local application is performed. Referring to the taxonomy 800 in FIG. 8, this discovery may be made using one or more alternative methods. For example, the monitoring service 220 can enumerate instances of performance counters (805), read a configuration file (810), read a configuration database (815), or evaluate network traffic (820).

Returning again to FIG. 4, at block 425, the external resources are instantiated into the health map if they are not already previously known. At block 430, health indicators for the local applications are monitored. As shown in the taxonomy 900, in FIG. 9, the health indicators may include one or more of the following: events 905, performance counters 910, synthetic transactions 915 (e.g., those transactions implemented using a Lync server), SysLog service events 920, and SNMP service events 925.

Returning once more to FIG. 4, at block 435, the health indicators 900 are attributed to either the health of a local application or the health of an external resource. At block 440, in the event of a fault, then the single root cause alert 230 (FIG. 2) can be raised by the monitoring service. At block 445, the service groups and service environments affected by the fault are indicated.

For example, if non-partitioned external resource Y (element 360 in FIG. 3) fails in the production environment 300, then the servers supporting service group A (element 325 in FIG. 3) will detect the fault as they have a dependency on that resource. The alert can report that the service group A 325 is impacted, but the service group servers are not the root cause for the failure. In another example, if partition 1 of the partitioned resource Q (element 390 in FIG. 3) fails in the test environment 305, all four local applications (i.e., the two instances of local application A and the two instances of local application B) will be impacted, but a single alert should be raised by the monitoring service to the operations center that partition 1 of resource Q is the root cause of the fault. The alert can report that service groups A and B, 345 and 355, in the test environment 305 are both impacted, but are not the root cause of the fault.

Figure 10:
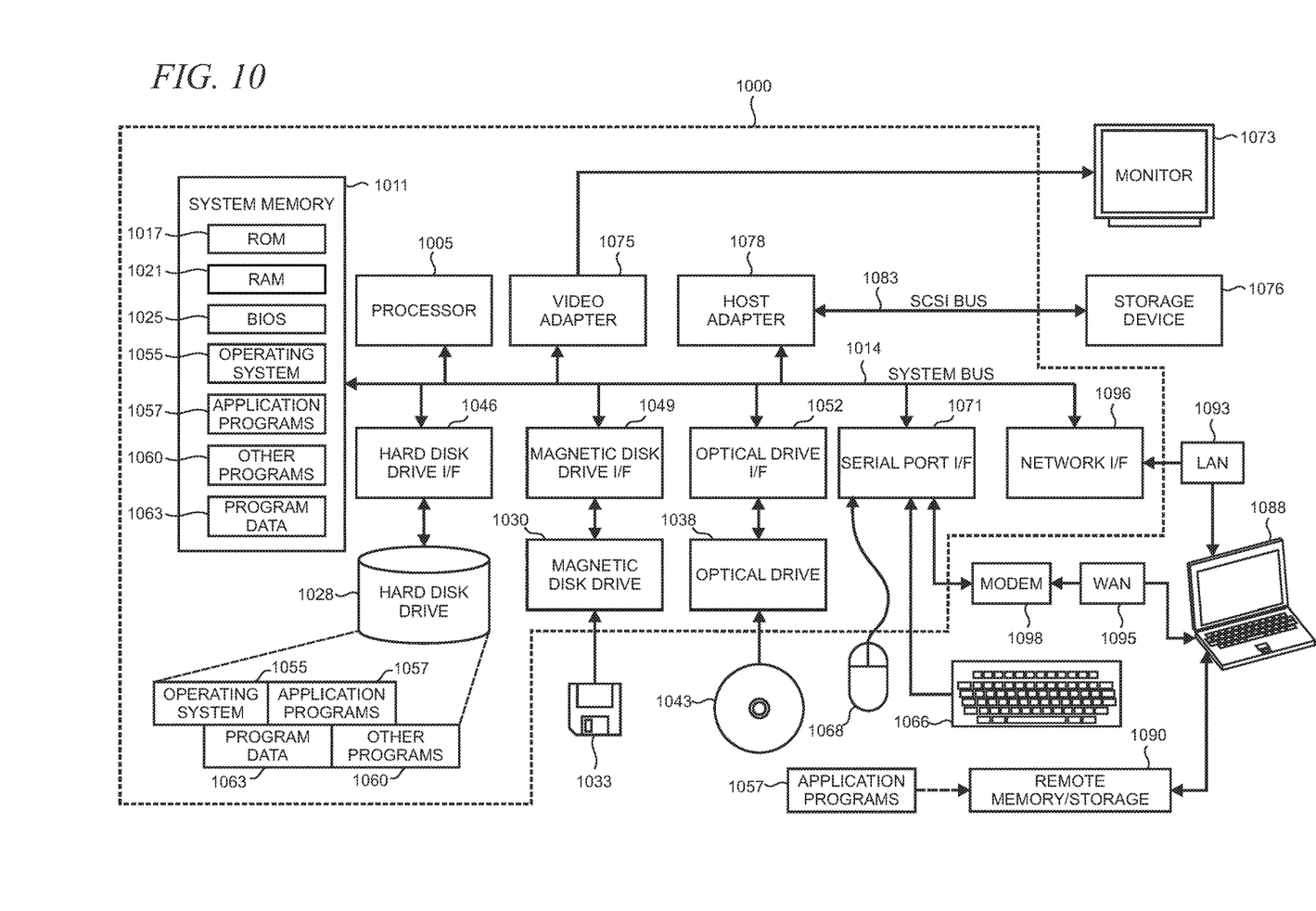
FIG. 10 is a simplified block diagram of an illustrative computer system such as a personal computer ("PC") that may be used in part to implement the present dynamic discovery of applications, external dependencies, and relationships.

FIG. 10 is a simplified block diagram of an illustrative computer system 1000 such as a PC, client device, or server with which the present dynamic discovery of applications, external dependencies, and relationships may be implemented. Computer system 1000 includes a processing unit 1005, a system memory 1011, and a system bus 1014 that couples various system components including the system memory 1011 to the processing unit 1005. The system bus 1014 may be any of several types of bus structures including a memory bus or memory controller, a peripheral bus, and a local bus using any of a variety of bus architectures. The system memory 1011 includes read only memory ("ROM") 1017 and random access memory ("RAM") 1021. A basic input/output system ("BIOS") 1025, containing the basic routines that help to transfer information between elements within the computer system 1000, such as during startup, is stored in ROM 1017. The computer system 1000 may further include a hard disk drive 1028 for reading from and writing to an internally disposed hard disk (not shown), a magnetic disk drive 1030 for reading from or writing to a removable magnetic disk 1033 (e.g., a floppy disk), and an optical disk drive 1038 for reading from or writing to a removable optical disk 1043 such as a CD (compact disc), DVD (digital versatile disc), or other optical media. The hard disk drive 1028, magnetic disk drive 1030, and optical disk drive 1038 are connected to the system bus 1014 by a hard disk drive interface 1046, a magnetic disk drive interface 1049, and an optical drive interface 1052, respectively. The drives and their associated computer-readable storage media provide non-volatile storage of computer-readable instructions, data structures, program modules, and other data for the computer system 1000. Although this illustrative example shows a hard disk, a removable magnetic disk 1033, and a removable optical disk 1043, other types of computer-readable storage media which can store data that is accessible by a computer such as magnetic cassettes, flash memory cards, digital video disks, data cartridges, random access memories ("RAMs"), read only memories ("ROMs"), and the like may also be used in some applications of the present dynamic discovery of applications, external dependencies, and relationships. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1033, optical disk 1043, ROM 1017, or RAM 1021, including an operating system 1055, one or more application programs 1057, other program modules 1060, and program data 1063. A user may enter commands and information into the computer system 1000 through input devices such as a keyboard 1066 and pointing device 1068 such as a mouse. Other input devices (not shown) may include a microphone, joystick, game pad, satellite dish, scanner, trackball, touchpad, touch screen, touch-sensitive module or device, gesture-recognition module or device, voice recognition module or device, voice command module or device, or the like. These and other input devices are often connected to the processing unit 1005 through a serial port interface 1071 that is coupled to the system bus 1014, but may be connected by other interfaces, such as a parallel port, game port, or universal serial bus ("USB"). A monitor 1073 or other type of display device is also connected to the system bus 1014 via an interface, such as a video adapter 1075. In addition to the monitor 1073, personal computers typically include other peripheral output devices (not shown), such as speakers and printers. The illustrative example shown in FIG. 10 also includes a host adapter 1078, a Small Computer System Interface ("SCSI") bus 1083, and an external storage device 1076 connected to the SCSI bus 1083.

The computer system 1000 is operable in a networked environment using logical connections to one or more remote computers, such as a remote computer 1088. The remote computer 1088 may be selected as another personal computer, a server, a router, a network PC, a peer device, or other common network node, and typically includes many or all of the elements described above relative to the computer system 1000, although only a single representative remote memory/storage device 1090 is shown in FIG. 10. The logical connections depicted in FIG. 10 include a local area network ("LAN") 1093 and a wide area network ("WAN") 1095. Such networking environments are often deployed, for example, in offices, enterprise-wide computer networks, intranets, and the Internet.

When used in a LAN networking environment, the computer system 1000 is connected to the local area network 1093 through a network interface or adapter 1096. When used in a WAN networking environment, the computer system 1000 typically includes a broadband modem 1098, network gateway, or other means for establishing communications over the wide area network 1095, such as the Internet. The broadband modem 1098, which may be internal or external, is connected to the system bus 1014 via a serial port interface 1071. In a networked environment, program modules related to the computer system 1000, or portions thereof, may be stored in the remote memory storage device 1090. It is noted that the network connections shown in FIG. 10 are illustrative and other means of establishing a communications link between the computers may be used depending on the specific requirements of an application of dynamic discovery of applications, external dependencies, and relationships.

Figure 11:
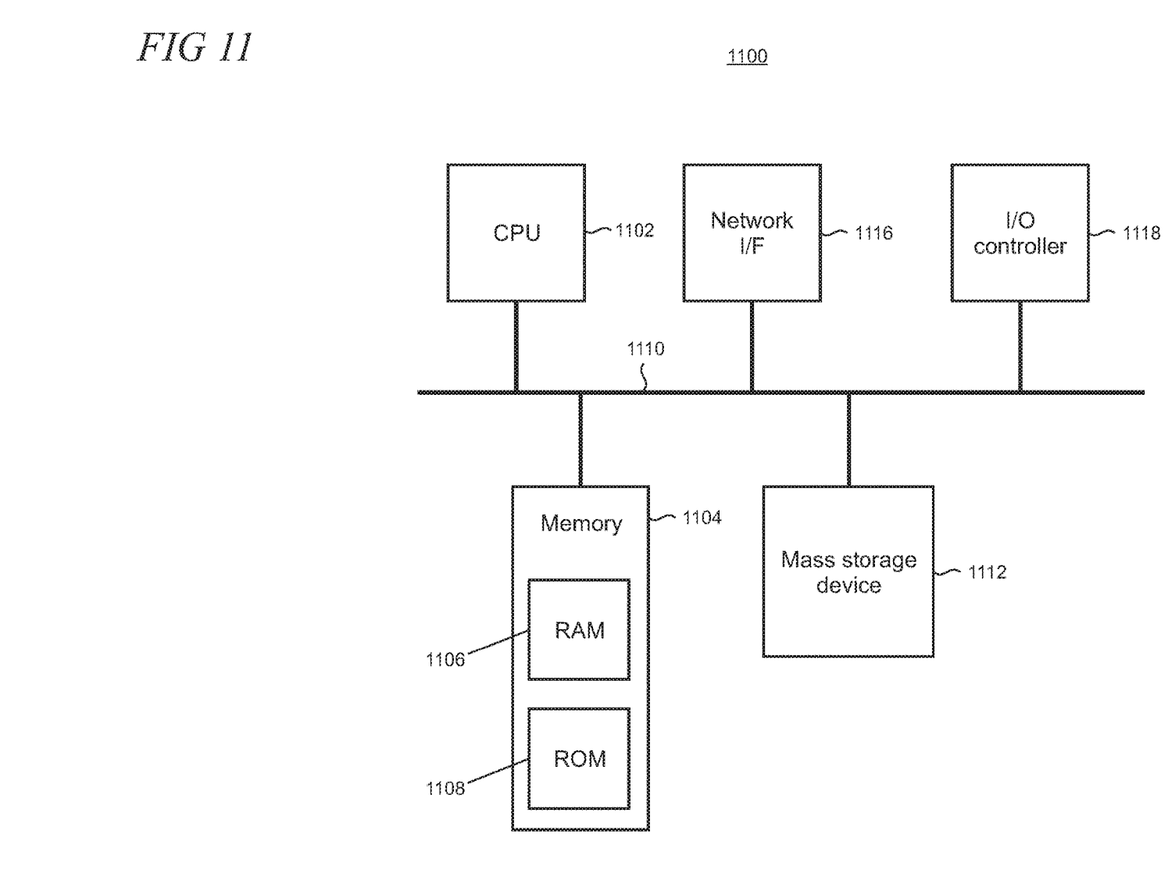
FIG. 11 shows a block diagram of an illustrative computing platform that may be used in part to implement the present dynamic discovery of applications, external dependencies, and relationships.

FIG. 11 shows an illustrative architecture 1100 for a computing platform or device capable of executing the various components described herein for dynamically discovering applications, external dependencies, and relationships. Thus, the architecture 1100 illustrated in FIG. 11 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 1100 may be utilized to execute any aspect of the components presented herein.

The architecture 1100 illustrated in FIG. 11 includes a CPU 1102, a system memory 1104, including a RAM 1106 and a ROM 1108, and a system bus 1110 that couples the memory 1104 to the CPU 1102. A basic input/output system containing the basic routines that help to transfer information between elements within the architecture 1100, such as during startup, is stored in the ROM 1108. The architecture 1100 further includes a mass storage device 1112 for storing software code or other computer-executed code that is utilized to implement applications, the file system, and the operating system.

The mass storage device 1112 is connected to the CPU 1102 through a mass storage controller (not shown) connected to the bus 1110. The mass storage device 1112 and its associated computer-readable storage media provide non-volatile storage for the architecture 1100. Although the description of computer-readable storage media contained herein refers to a mass storage device, such as a hard disk or CD-ROM drive, it should be appreciated by those skilled in the art that computer-readable media can be any available computer storage media that can be accessed by the architecture 1100.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which can be used to store the desired information and which can be accessed by the architecture 1100.

According to various embodiments, the architecture 1100 may operate in a networked environment using logical connections to remote computers through a network. The architecture 1100 may connect to the network through a network interface unit 1116 connected to the bus 1110. It should be appreciated that the network interface unit 1116 also may be utilized to connect to other types of networks and remote computer systems. The architecture 1100 also may include an input/output controller 1118 for receiving and processing input from a number of other devices, including a keyboard, mouse, or electronic stylus (not shown in FIG. 11). Similarly, the input/output controller 1118 may provide output to a display screen, a printer, or other type of output device (also not shown in FIG. 11).

It should be appreciated that the software components described herein may, when loaded into the CPU 1102 and executed, transform the CPU 1102 and the overall architecture 1100 from a general-purpose computing system into a special-purpose computing system customized to facilitate the functionality presented herein. The CPU 1102 may be constructed from any number of transistors or other discrete circuit elements, which may individually or collectively assume any number of states. More specifically, the CPU 1102 may operate as a finite-state machine, in response to executable instructions contained within the software modules disclosed herein. These computer-executable instructions may transform the CPU 1102 by specifying how the CPU 1102 transitions between states, thereby transforming the transistors or other discrete hardware elements constituting the CPU 1102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1100 in order to store and execute the software components presented herein. It also should be appreciated that the architecture 1100 may include other types of computing devices, including hand-held computers, embedded computer systems, smartphones, PDAs, and other types of computing devices known to those skilled in the art. It is also contemplated that the architecture 1100 may not include all of the components shown in FIG. 11, may include other components that are not explicitly shown in FIG. 11, or may utilize an architecture completely different from that shown in FIG. 11.

Based on the foregoing, it should be appreciated that technologies for dynamically discovering applications, external dependencies, and relationships is disclosed. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for monitoring health of applications, the method comprising the steps of:
    determining that a local application is comprised in a service group;
    determining a service environment to which the local application belongs, the service environment being a group of service groups, at least one of the service groups comprising one or more local applications;
    instantiating objects for representing the service environment and at least another service environment in a health map;
    adding objects to the health map that represent external resources;
    monitoring health indicators for the local applications, the service groups, the service environments and the external resources;
    attributing the health indicators to either health of the local application or health of one or more of the external resources; and
    raising a root cause alert to indicate a fault, the fault being attributable to either the local application or the one or more external resources.

2. The method of claim 1, wherein the service environment to which the discovered local application belongs is a production service environment and the other service environment comprises a test service environment that duplicates the production service environment.

3. The method of claim 2, further comprising:
    triggering one or more actions within the test service environment in response to the root cause alert indicating the fault.

4. The method of claim 2, wherein triggering one or more actions within the test service environment further comprises:
    triggering one or more of tests, diagnostics, duplication of problems causing the fault and testing potential solutions and workarounds within the test service environment.

5. The method of claim 1, wherein adding the external resources to the health map further comprises:
    adding one or more of partitioned and non-partitioned external resources to the health map.

6. The method of claim 5, wherein adding non-partitioned resources to the health map further comprises:
    adding services utilized by the local application that are outside of the local application such that each of the services appears as a single entity to the local application.

7. The method of claim 5, wherein adding partitioned resources to the health map further comprises:
    adding services utilized by the local application that are outside of the local application such that partitions of the services are visible to the local application.

8. The method of claim 7, wherein adding partitioned resources to the health map further comprises:
    dynamically adding partitions to and removing partitions from the health map as partitions are dynamically added to or removed from the partitioned resources.

9. The method of claim 1, wherein monitoring health indicators further comprises:
    monitoring one or more of events, performance counters, synthetic transactions, and service events.

10. The method of claim 1, wherein raising a root cause alert further comprises:
    indicating within the root cause alert, parts of the service environment that are affected by the fault.

11. A system for monitoring health of an enterprise-scale service environment comprising:
    at least one processor;
    a computer-readable storage medium storing instructions that cause the processor to:
    discover objects to be included in a health map, the objects representing at least the service environment that comprises at least a service group, the service group including at least one local application;
    instantiate the objects into the health map;
    monitor health indicators for the local application represented in the health map;
    generate a root cause alert when a fault is detected within the service environment; and
    provide an indication of the service group and service environment affected by the detected fault.

12. The system of claim 11, further comprising causing the processor to:
    dynamically update the health map to delete objects representing one or more of the service environment, the service group and the local application that are removed from service; and
    dynamically update the health map to add new objects representing one or more of other service environment, other service group or another local application that are added to the service.

13. The system of claim 11, wherein the instructions for discovering the objects further comprise instructions that cause the processor to:
    make a determination on whether or not the local application is present on a server in the service environment.

14. The system of claim 13, wherein the instructions to make the determination regarding the local application further comprise instructions that cause the processor to:
    query the service environment if a specific registry key is present and if a specific file exists on a local file system or if a specific environment variable is set.

15. The system of claim 11, wherein instructions to instantiate the objects into the health map further comprise instructions that cause the processor to:
    add the service group to the health map if the service group associated with the local application is not currently in the health map; and
    add the service environment to the health map if the service environment associated with the local application and the service group is not currently in the health map.

16. The system of claim 11, wherein instructions to instantiate the objects into the health map further comprise instructions that cause the processor to:
    instantiating external resources used by the local application into the health map.

17. The system of claim 11, wherein the service environment is a production service environment or a test service environment.

18. A non-transitory, processor-readable, storage medium comprising processor-readable instructions for:
    determining that a local application is present in a service group;
    determining a service environment to which the local application belongs, the service environment being a group of service groups, at least one of the service groups comprising one or more local applications serving a common consumer;

instantiating the service environment and other service environments as objects in a health map;

adding further objects to the health map for representing external resources;

monitoring health indicators for the local applications, the service groups, the service environments and the external resources;

attributing the health indicators to either health of the local application or health of one or more of the external resources; and raising a root cause alert to indicate a fault, the fault being attributable to either the local application or the one or more external resources.

19. The storage medium of claim 18, wherein the instructions for determining the service environment to which the local application belongs further comprise instructions to determine if the local application belongs in one of a production service environment or a test service environment that duplicates the production service environment.

20. The storage medium of claim 18, wherein the instructions for raising a root cause alert to indicate a fault further comprise instructions for triggering one or more actions within the test service environment in response to the root cause alert indicating the fault within the production service environment.

* * * * *